United States Patent [19]

Lougeay, Jr. et al.

[11] 3,775,569

[45] Nov. 27, 1973

[54] AUTOMATIC MESSAGE CONTROLLER

[75] Inventors: Edmund L. Lougeay, Jr., Belleville; Charles Garner, East St. Louis, both of Ill.

[73] Assignees: Ronald E. Winston, Belleville; Glen S. Oliver, Aviston, Ill., part interest to each

[22] Filed: Feb. 14, 1972

[21] Appl. No.: 226,112

Related U.S. Application Data

[63] Continuation-in-part of Ser. No. 56,456, July 20, 1970, abandoned.

[52] U.S. Cl. .................... 179/100.2 S, 179/100.1 C

[51] Int. Cl. ...................... G11b 15/06, G11b 23/18

[58] Field of Search ............ 179/100.1 C, 100.1 PS, 179/100.2 S, 100.2 MD

[56] References Cited

UNITED STATES PATENTS

| | | | |
|---|---|---|---|
| 3,147,346 | 9/1964 | Herman | 179/100.1 C |
| 2,514,578 | 7/1950 | Heller | 179/100.2 S |
| 2,834,840 | 5/1958 | Flan | 179/100.1 C |
| 2,995,630 | 8/1961 | Kabrick | 179/100.1 PS |
| 3,659,059 | 4/1972 | Ivy | 179/100.2 S |

*Primary Examiner*—Terrell W. Fears
*Assistant Examiner*—Jay P. Lucas
*Attorney*—Harvey B. Jacobson

[57] ABSTRACT

Playback operation of a stereo tape cartridge type of player-recorder is automatically controlled to replay a pre-recorded message. A control signal recorded on one track of the tape following the recorded message on the other track initiates an off or rewind operation and a timing cycle, and pulses a counter through which the number of replays is preset.

7 Claims, 3 Drawing Figures

AUTOMATIC MESSAGE CONTROLLER

This is a continuation-in-part application of U. S. Ser. No. 56,456, filed July 20, 1970, now abandoned.

This invention relates to an automatic control system for a player-recorder device.

Multi-track tape player-recorder devices are well known and feature various controls to select the operational mode such as recording, playback, rewind and off operations as well as to set volume or signal level. Such player-recorder devices would be extremely useful in public places and commercial establishments where recorded messages are to be played at repeated intervals. Periodic public announcements, for example, are often made at department stores, railroad depots, airports, bus terminals, etc., while commercial or promotional messages are often desired at fairs, sales, cafeterias, exhibits, discount stores, drive-in restaurants, etc. A control system for appropriately controlling operation of a player-recorder device such as a stereo tape cartridge type would therefore be very desirable for such purposes. It is therefore an important object of the present invention to provide an automatic control system for player-recorder devices capable of meeting the aforementioned requirements for public and commercial establishments.

In accordance with the present invention, separate tracks on a recording tape are utilized to record a message on one track followed by a control or "cue" signal recorded on the other track. The automatic control system of the present invention incorporates three modes of operation, hereinafter referred to as "Manual," "Repeat," and "Progressive" modes. The "Manual" mode is used for tape preparation including the recording of separate messages to be played back. While playing back in the "Repeat" mode, a "cue" signal is provided upon the completion of each played message and is operative to trigger a rewind control in order to return the tape to its original position at the beginning of the prerecorded message for replay purposes.

When the mode selection switch is in the "Progressive" position, the "cue" signal is effective to trigger an "off" control. This stops advancement of the tape until a play signal is provided from a timer after the completion of a pre-selected time interval. The time interval is initiated by the "cue" signal upon the completion of playback of a recorded message. In addition, the control system is provided with a counter which counts the number of "cue" signals and is effective to either rewind the tape when the mode selection switch is in the "Progressive" position or to eject the tape cartridge when the mode selection switch is in the "Repeat" position.

The controls and the timer are operated on low voltage from an auxiliary power supply energized by a primary power source through which the rewind, playback, off and eject solenoids of the player-recorder are also operated, as well as the reset and stepping coils of the counter switch assembly. Audio signals such as music from some external source may also be continuously reproduced through the speaker of the player-recorder and interrupted during the pre-recorded message intervals.

These together with other objects and advantages which will become subsequently apparent reside in the details of construction and operation as more fully hereinafter described and claimed, reference being had to the accompanying drawings forming a part hereof, wherein like numerals refer to like parts throughout.

Figures 1, 3:
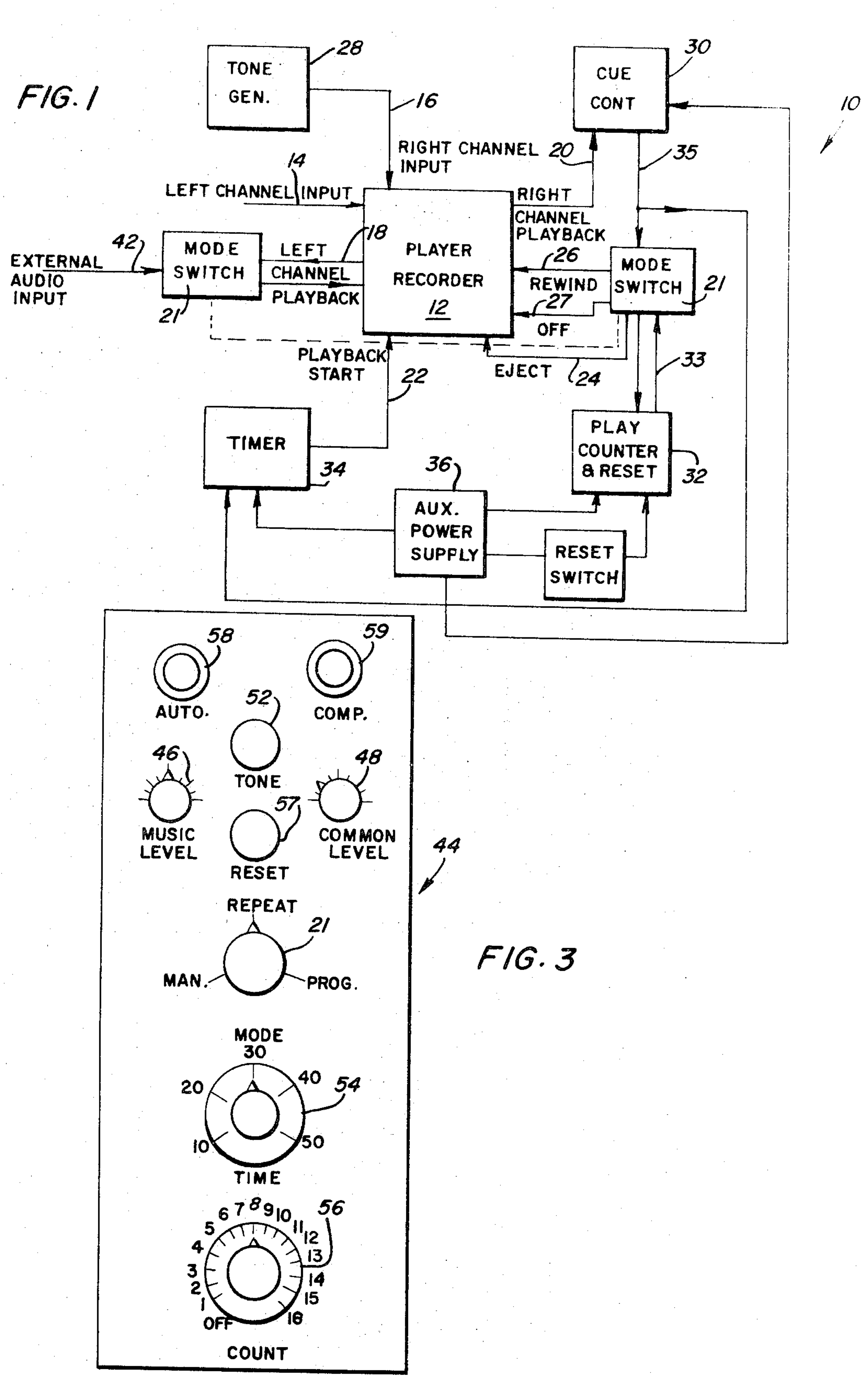
FIG. 1 is a schematic block diagram illustrating the system of the present invention.
FIG. 3 is a front elevational view of the control panels associated with the system of the present invention.

Referring now to the drawings in detail and initially to FIG. 1, the automatic message control system, generally denoted by reference numeral 10, is associated with a conventional or commercially available player-recorder, generally referred to by the numeral 12. The device 12 may be a stereo tape player-recorder of the cartridge type having separate recording heads and playback heads for recording and reproducing audio signals on at least two tracks of magnetic recording tape that is conveyed past the heads by means of a tape transport mechanism engageable with the tape within the cartridge that is inserted into the player-recorder housing upon opening of a door. Various push button controls are associated with such a player-recorder in order to initiate playback operation, recording operation, and rewind operation etc. The player-recorder is therefore provided with at least two channels through which audio signals are recorded and through which the recorded signals are reproduced through the speaker. Accordingly, FIG. 1 diagrammatically illustrates left and right channel inputs 14 and 16 and left and right channel outputs 18 and 20, respectively, such as those usually associated with commercially available player-recorder devices. Also diagrammatically shown in FIG. 1 is a mode selection switch 21, a playback start control line 22, an eject control line 24, a rewind control line 26 and an off control line 27, with which suitable solenoids are associated for controlling the tape transport mechanism.

In accordance with the present invention, a message may be recorded on one track of the tape through the left channel input 14, for example, while a "cue" or control signal originating from a tone generator 28, is recorded through the right channel input 16 on the other track of the tape following completion of the message on the left channel track of the tape. Thus, while the player-recorder is in its playback mode of operation, following the completion of the message, a control signal will be fed through the output line of the right channel 20 to a cue control component 30 from which a signal is derived and fed through the mode selection switch 21 to the player-recorder for initiating "Rewind" operation if in "Repeat" mode, or an "Off" condition if in "Progressive" mode. The "cue" output signal of the cue control component 30 is also fed to a commercially available type of counter component 32, such that, after a pre-selected number of messages has been played, an output signal from the counter will be fed through line 33 to the mode selection switch and directed to one of the solenoids of the player-recorder in order to perform the desired function. With the selector switch in the "Repeat" mode, the output signal from the counter is effective to energize the eject solenoid of the player-recorder and terminate operation thereof. On the other hand, if the mode selection switch is in the "Progressive" position, the output signal from the counter is effective to energize the rewind solenoid of the player-recorder to return the tape to its original starting position and to reset the counter to zero as hereinafter explained.

The control system as shown in FIG. 1 also includes a timer component 34, through which a time interval is initiated whenever cue control line 35 is energized. The timer component is preset by a user to provide a desired time interval spacing between each message replay. At the end of each time interval, a signal is fed through line 22 to the player-recorder for initiating replay. Preferably, both the cue control component 30 and the timer component 34 are operated at a relatively low voltage, supplied thereto by an auxiliary power supply 36, which also controls operation of the counter 32.

It will be appreciated, that when mode selection switch 21 is in the "Repeat" position, the player-recorder will be operative to reproduce through its speaker, or remote speakers, a single message that is replayed at timed intervals and for a preset number of times, determined by counter 32. When the number of single message replays has been completed, an "Eject" signal is sent to the player-recorder through line 24 to eject the cartridge and terminate any further operation.

When in the "Progressive" mode of operation, the player-recorder will replay a series of messages at timed intervals between each message, with a "cue" signal at the end of each message, and when the preset number of messages has been replayed the counter 32 will initiate "Rewind" to return the tape to its original starting position. The time intervals between the playback of each message are selected by setting the timer component 34. The output message signals to the speaker are routed through an audio switching relay which interrupts an external audio input 42, such as a music system, when the player-recorder is playing back a message. This automatically provides background music which is played between each message.

FIG. 3 illustrates the control panel 44 associated with the automatic message controller. The relative loudness of the background music and the pre-recorded message signals being reproduced by the speaker of the player-recorder may be adjusted by the music level control 46. In addition, a Common Level control 48 may be provided for setting the desired common loudness of the music and message play.

When the system is placed in the "Manual" mode of operation, by means of the mode selection switch, a message may be recorded on the left channel track of the tape, and immediately following this message, a control signal may be recorded on the other track of the tape by depressing a tone push button switch 52 for a period of approximately 2 seconds. By means of a timer control 54, the time interval between the replay of each message may be set, while the counter control 56 may be set in order to select the desired number of message replays. The play counter 32 may be recycled to zero by depressing a reset push button switch 57 when selection switch 21 is in the "Manual" mode only. Once the control system is conditioned as indicated through the controls on the control panel 44, the mode selection switch 21 may be turned to the mode of operation desired to initiate automatic operation, at which time a pilot lamp 58 is illuminated.

Figure 2:
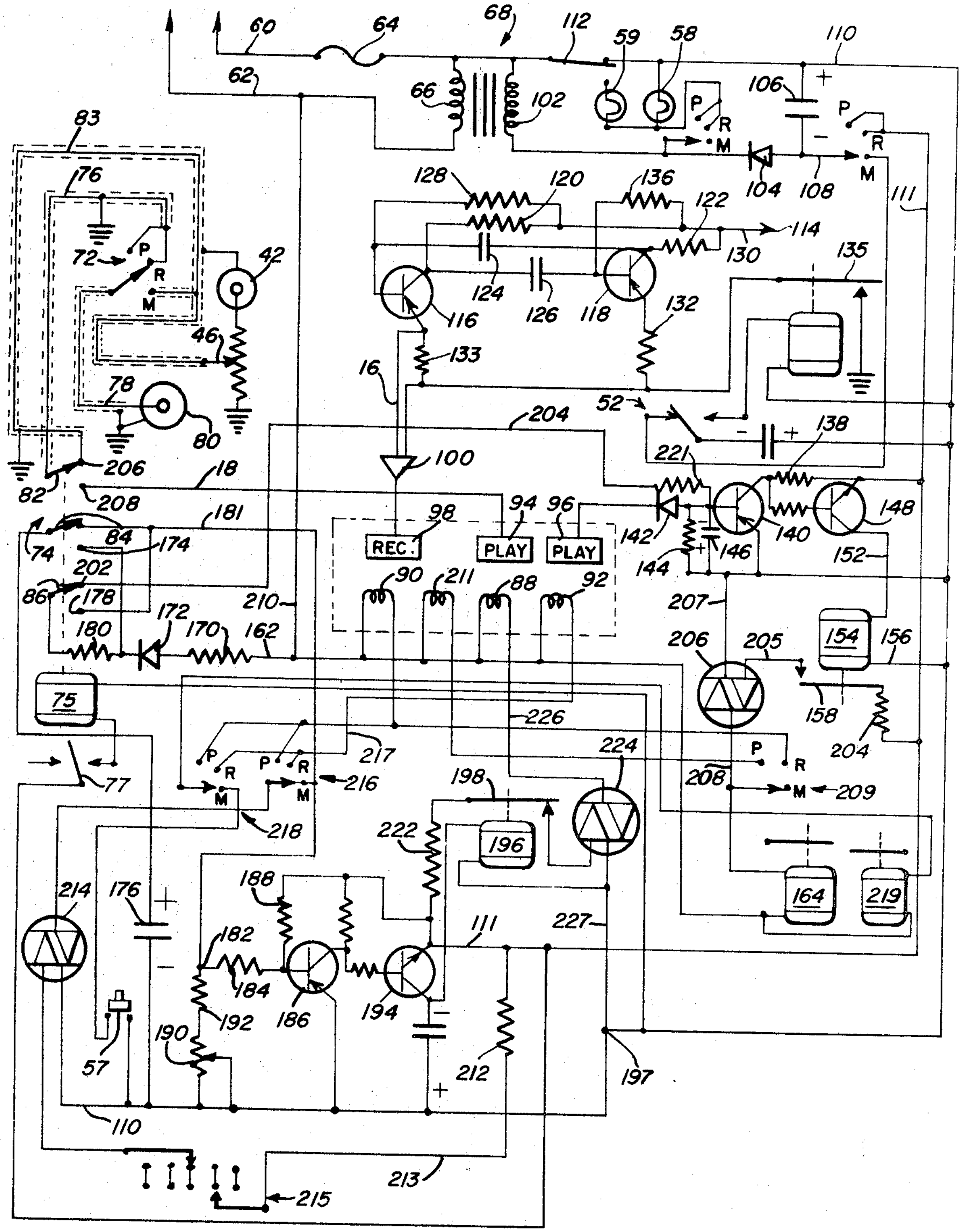
FIG. 2 is an electrical circuit diagram illustrating one embodiment of the present invention.

Referring now to FIG. 2, the automatic control system 10 is supplied with electrical energy from a common electrical source, such as a 120 VAC supply, connected to the power lines 60 and 62 constituting the primary source of voltage. Power line 60 is connected by a fuse 64 to one terminal of the primary winding 66 in a step down transformer 68, and to one terminal of the secondary winding 102. Mode selection switch 21 is provided with a three-position selector switch section 72 which, in the position illustrated, connects an operational mode relay switch assembly 74 through shielded conductor 76 to a shielded conductor 78 connected to an audio output plug 80. Mode relay switch assembly 74 is operated by a coil 75, energized through a micro switch 77 when the "Play" solenoid is energized. Switch section 82, in one of two operative positions, as illustrated, is connected by a shielded conductor 83 to the movable arm of potentiometer 46, connected between ground and the external audio input 42. Thus, when the mode selection switch is in the "Progressive" or "Repeat" positions, background music from an external source may be continuously provided to the audio output plug 80 at a level determined by the setting of loudness potentiometer 46. However, when switch section 82 is displaced to its other operative position, corresponding to replay operation of the player-recorder, the left channel output signal line 18 is connected to the shielded cable 76 so that output from the left channel may be fed through switch section 72 to the audio output plug 80 for reproducing the pre-recorded message. In addition, the audio input from the external source through 42 is automatically interrupted.

In the "Manual" position M, of the selection switch 21, switch section 72 connects the audio input of the external source by way of 42 through potentiometer 46 to the audio output plug 80, through shielded conductor 78 which by-passes switch section 82. Mode relay switch assembly 74 also includes switch sections 84 and 86, ganged with the switch section 82 and adapted to be displaced between the position illustrated in FIG. 2 and the other operative position by way of coil 75 when energized during playback operation.

Playback operation of the player-recorder is initiated by pulsing of a "Play" solenoid 88, while rewind operation is initiated by the pulsing of a "Rewind" solenoid 90. Also, in the cartridge type of player-recorder with which the present invention is associated, operation is prevented until the tape cartridge is enclosed within the housing of the player-recorder and the door through which it is received is fully closed. If this door is opened, operation of the player-recorder is terminated, as hereinafter explained. It will be appreciated, by pulsing of an eject solenoid 92, associated with the player-recorder, the tape cartridge which has been played is automatically ejected, thereby opening the above-mentioned door to terminate operation of the player-recorder.

Also shown in connection with the player-recorder in FIG. 2, are pickup heads 94 and 96, respectively associated with the left and right channel outputs 18 and 20. The right channel input is connected to a record head 98 through the output of a recording amplifier 100, to which a "cue" signal is fed from the tone generator 28 through input line 16. The other components of the player-recorder, being well known, are not illustrated.

The auxiliary power supply component 36 is energized by the voltage step-down transformer 68 connected to the primary source of electrical energy across power line 60 and 62, as aforementioned. The output terminals of the secondary winding 102 of the transformer are monitored by the pilot lamps 58 and 59. Pilot lamp 58 indicates that the system is conditioned for automatic operation when the mode selection switch is in either the "Repeat" or "Progressive" positions. Pilot lamp 59 indicates that the preset number of repeated message replays has been completed and that operation has been terminated when the selection switch is in the "Repeat" position.

The A.C. output of the transformer 68 is rectified by a diode 104 connected to one side of the secondary winding and filtered by a filter capacitor 106 connected across the D.C. voltage lines 108 and 110, through which a relatively low D.C. voltage is supplied to the cue control component 30 and the timer component 34. The D.C. output of the auxiliary power supply component 36 may however be interrupted by disconnecting line 110 from the secondary winding of the transformer upon opening of a door switch 112 which is closed upon closing of the above-mentioned door of the player-recorder after insertion of the tape cartridge.

Power for operating the tone generator 28 is derived from the player-recorder itself supplying a negative 7.4 volt potential to terminal 114, as shown in FIG. 2, so that upon depression of the push button tone switch 52, energy will be available for maintaining operation of the oscillator transistors 116 and 118 associated with the tone generator. The collectors of the transistors are accordingly connected to the negative 7.4 volt potential at terminal 114 through load resistors 120 and 122 while the collector and bases are cross-connected by signal coupling capacitors 124 and 126. The signal switching level for transistors 116 and 118 is maintained by resistor 128 and 136 connected between the bases and the supply line 130. The emitters of transistors 116 and 118 are connected through resistors 132 and 133 by relay switch 135 to the player-recorder ground.

An oscillating signal of audio frequency value is fed from the emitter of transistor 116 to the right channel input 16 thereby establishing a "cue" signal that is placed on the tape through the record head 98. The tone generator may be activated for a period of time by depressing the tone switch 52 while the player-recorder is being operated in its conventional message recording mode in order to record on one track of the tape through the right channel, the control signal following the recording of a desired message on the other track of the tape through the left channel of the player-recorder. The mode selection switch 21 is in the manual position M when the player-recorder is being used in its conventional manner in order to record signals on the tracks of the tape through the left and right channels.

When the mode selection switch is placed in either the "Repeat" position R or the "Progressive" position P, a D.C. operating voltage is supplied through line 111 and voltage reducing resistor 138 to the collector of transistor 140 in the cue control component 30. The transistor 140 is switched on by a negative signal supplied thereto from the pickup head 96 associated with the right channel of the player-recorder. The pickup head 96 is accordingly connected by the diode 142 to the base of the transistor 140, the signal switching level of which is limited by the resistor 144 connected between the base and the positive ground voltage line 110 of the auxiliary power supply. A filter capacitor 146 is connected in parallel with the resistor 144 so that transient signals will not unintentionally switch on the transistor 140.

In response to the control signal derived from the right channel track of the tape, the transistor 140 is rendered conductive so as to supply a forward bias to the base of amplifier transistor 148 in the cue control component 30. The emitter of transistor 148 is connected to the voltage line 111, while an amplified output is obtained at the collector, thereby supplying an energizing pulse through conductor 152 to the relay coil 154, which is also connected by conductor 156 to ground line 110.

When the relay coil 154 is energized, the normally open relay switch 158 associated therewith is closed so as to provide a trigger voltage through resistor 204 and conductor 205 to the gate of Triac 206. One anode of Triac 206 is connected by conductor 207 to ground line 110, while the other anode is connected by conductor 208 to one side of a counter relay 164 and to switch section 209 of mode selection switch 21. In "Repeat" mode of operation section 209 connects to conductor 208 to one side of rewind solenoid 90, the other side of this solenoid being connected by conductor 210 to A.C. line 62. It will be appreciated that when rewind solenoid 90 is energized, it is effective to initiate the rewind operation of the player-recorder. Counter relay 164 is connected to A.C. line 62 by way of conductor 210, for energization thereof. When switch section 209 is in the "Repeat" position, each time the rewind operation is initiated by the pulsing of the rewind solenoid 90, the step switch associated with the counter is advanced by counter relay 164 until the preselected number of counts has been made.

When the mode selection switch is in the "Progressive" position P, it connects line 208 to one side of an "Off" solenoid 211, the other side of which is connected to conductor 210 and A.C. line 62. A step switch 215 associated with the counter is automatically advanced until the number of pre-selected playbacks has been made, at which time a trigger voltage is supplied through resistor 212 and conductor 213 to the gate of Triac 214, having one anode connected to line 110 and the other anode connected to switch section 216 of the mode selection switch. When switch section 216 is in the "Repeat" position R, solenoid 92 is energized through conductor 217 to eject the tape cartridge when Triac 214 is switched on by counter switch 215. When the mode selection switch is in the "Progressive" position, Triac 214 is connected to conductor 208 and to one side of the rewind solenoid 90.

The mode selection switch is further provided with a switch section 218 which connects one side of counter reset coil 219 to conductor 217 and eject solenoid 92 when the mode selection switch is in the "Repeat" position and to conductor 208 when the selection switch is in the "Progressive" position. The other side of the coil 219 is connected to conductor 210 and A.C. line 62. Accordingly, after a predetermined number of replays has been counted, with the mode selection switch in the "Repeat" position, the eject solenoid 92 is energized to open the cartridge door and operating switch 112 to disconnect the auxiliary power supply. Operation of the automatic control system is further terminated, and lamp 59 is energized to indicate such.

When the mode selection switch is in the "Progressive" mode after a predetermined number of messages in a series of messages has been counted, the rewind solenoid 90 is energized to rewind the tape cartridge to its original position and resume operation until manually terminated by the operator. The counter in each mode of operation is automatically reset when the preset number of messages or "cue" signals have been counted. The counter can also be manually reset by depressing push button switch 57 when the selection switch is in the "Manual" position.

While the player-recorder is in its playback operational mode, the switch assembly 74 is displaced to the other operative position from that shown in FIG. 2. In this operative position, a charging circuit is completed from the A.C. voltage line 162, through voltage reducing resistor 170 and diode rectifier 172 to contact 174 engaged by the switch section 84 connected to one side of storage capacitor 176 associated with the timer component 34. At the same time, switch section 86 engages contact 178 so as to apply a positive voltage from the rectifier diode 172, through a voltage reducing resistor 180 and line 181 to junction 182 in the timer component.

The junction 182 is connected by the resistor 184 to the base of transistor 186 so as to supply cut-off voltage thereto holding the transistor in a non-conductive state during playback operation. Base bias for the transistor 186 is established by resistor 188 connected to the negative D.C. voltage line 111 from the auxiliary power supply.

When the rewind operation is initiated by energization of the rewind solenoid 90 as aforementioned, the switch assembly 74 is displaced to its operative position shown in FIG. 2 and switch section 86 disconnects the capacitor 176 from the charging circuit and connects it to the junction 182 for discharge through the resistor 192 and adjustable potentiometer control 190. At the end of a time interval which exceeds the duration of rewinding operation, the voltage at junction 182 drops below cut-off value so that transistor 186 is switched to its conductive state thereby applying a forward bias to the base of transistor 194.

It will be appreciated that when transistor 194 is switched on, it establishes a conductive path between one terminal of the relay coil 196 and D.C. voltage line 111, the other terminal of the relay coil being connected to the ground line 110 at junction 197. Thus, at the end of each time interval cycle, the timer component energizes relay coil 190 so as to close the normally open relay switch 198 associated therewith in order to provide a trigger voltage through resistor 222 to the gate of Triac 224. One anode of Triac 224 is connected through conductor 227 to ground line 110, while the other anode is connected by conductor 226 to the play solenoid 88 for energization thereof through conductor 210 to A.C. line 62. The play solenoid 88 as hereinbefore indicated is operative to effect replay of the message recorded on the left channel track of the tape.

During rewind operation with the switch assembly 74 in the position illustrated in FIG. 2, the switch section 86 engages contact 202 so that a D.C. cut-off voltage is supplied through conductor 204 and resistor 221 to the base of transistor 140 in order to prevent false operation thereof. The timer component, which is prevented from operation during playback operation of the player-recorder, is operationally interlocked through the switch assembly 74 to avoid malfunction of the system. The switch assembly 74 also coordinates operation of the system with an external music system through the audio input 42 as aforementioned. Accordingly, during playback operation the switch section 82 disengages contact 206 to disconnect the external source and connect the left channel output line 18 to the audio output plug 80 by way of contact 208. The audio input from the external source can be adjusted to desired level through the potentiometer 46.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a player-recorder device having recording and playback heads for recording audio signals on at least one of two tracks of a tape and reproducing signals on the tape to an output speaker, tape transport means for conveying the tape in a first direction in operative relation to said heads during playback and record operations and in a second direction during rewind operations, and means for disabling the transport means in response to off signals; an automatic message controller comprising: tone generator means for selectively providing cue signals to said recording head for recording such on the other of said two tracks of the tape following the recording of a message on said one of the tracks, timer means for initiating a time interval in response to playback of said cue signals and enabling said tape transport means upon completion of said time interval, and control means responsive to each of said cue signals for either actuating said disabling means by said off signals or actuating said rewind operation of said transport means, mode selection means having a "Repeat" selection for repeated playing of a single message followed by a single cue signal and a "Progressive" selection for continuously playing a series of messages each followed by a cue signal, said control means being responsive to playback of each cue signal to actuate said disabling means when said mode selection means is in said "Progressive" mode and to actuate said rewind operation when said mode selection means is in said "Repeat" mode, said control means including means for counting the number of said cue signals to either actuate said rewind operation when said mode selection means is in said "Progressive" mode or to deenergize said player-recorder device when said mode selection means is in said "Repeat" mode upon counting a preselected number of said cue signals.

2. The combination set forth in claim 1 wherein said player-recorder device includes eject means for terminating operation of said player-recorder device in response to the completion of said preselected number of counts by said counter means when said mode selection means is in said "Repeat" mode.

3. In combination with a player-recorder device having recording and playback heads for recording audio signals on at least one of two tracks of a tape and reproducing signals on the tape to drive an output speaker, tape transport means for selectively conveying the tape in operative relation to said heads during playback, record, and rewind operations, and means for disabling the transport means; an automatic message controller comprising: means for recording cue signals on the other of said two tracks of the tape following the recording of a message on said one of the tracks, mode selection means including a "Repeat" mode for repeated playing of a single message followed by said cue signal and a "Progressive" mode for continuously playing a series of messages each followed by one of said cue signals, and timer means for initiating a time interval in response to playback of each of said cue signals from said tape and enabling said tape transport means upon completion of said time interval, said automatic message controller including counter means for counting the number of cue signals to either actuate said rewind operation when said mode selection means is in said "Progressive" mode or to de-energize said player-recorder device when said mode selection means is in said "Repeat" mode upon counting a preselected number of said cue signals.

4. The combination set forth in claim 3 wherein said automatic message controller includes audio input means for providing audio signals from a source externally of the player-recorder device, and means responsive to said playback operation of said transport means for interrupting said audio signals from the external source during said playback operation.

5. In combination with a tape player device having playback heads for providing audio signals defining a message each followed by a cue signal on a tape, tape transport means for selectively conveying the tape in operative relation to said heads during playback and rewind operations, and means for disabling said transport means; an automatic message controller comprising: mode selection means including a "Repeat" mode for repeated playing of a single message followed by said cue signal and a "Progressive" mode for continuously playing a series of messages each followed by one of said cue signals, timer means for initiating a time interval in response to playback of each of said cue signals from said tape and enabling said tape transport means upon completion of said time interval, and counter means for counting the number of cue signals to either actuate said rewind operation when said mode selection means is in said "Progressive" mode or to deenergize said player device when said mode selection means is in said "Repeat" mode upon counting a preselected number of said cue signals.

6. The combination set forth in claim 5 wherein said player device includes eject means for terminating operation of said player device in response to the completion of said preselected number of counts by said counter means when said mode selection means is in said "Repeat" mode.

7. The combination set forth in claim 6 wherein said automatic message controller includes audio input means for providing audio signals from a source externally of said player device and means responsive to said playback operation of said transport means for interrupting said audio signals from said external source during said playback operation.

* * * * *